United States Patent [19]

Wittig et al.

[11] 4,210,819
[45] Jul. 1, 1980

[54] OPEN CYCLE OCEAN THERMAL ENERGY CONVERSION STEAM CONTROL AND BYPASS SYSTEM

[75] Inventors: J. Michael Wittig, West Goshen; Stephen J. Jennings, Radnor Township, Delaware County, both of Pa.

[73] Assignee: The United States of America as represented by the United States Department of Energy, Washington, D.C.

[21] Appl. No.: 934,574

[22] Filed: Aug. 17, 1978

[51] Int. Cl.² ............................................. F03G 7/04
[52] U.S. Cl. .................................... 290/52; 290/1 R; 60/641
[58] Field of Search ................... 290/1, 2, 52; 60/641, 60/671

[56] References Cited

U.S. PATENT DOCUMENTS

| 3,995,160 | 11/1976 | Zener et al. | 290/1 R |
|---|---|---|---|
| 4,069,673 | 1/1978 | Lapeyre | 290/52 X |
| 4,083,189 | 4/1978 | Fetkovich | 60/641 |
| 4,087,975 | 5/1978 | Owens | 60/641 |

OTHER PUBLICATIONS

Andrew Nizery–"Study of the Possibility of the Utilization of Thermal Energy of the Sea and of Solar Energy", Bulletin de l'Institute Oceanographique No. 906, Dec. 30, 1946.

*Primary Examiner*—Gene Z. Rubinson
*Assistant Examiner*—W. E. Duncanson, Jr.
*Attorney, Agent, or Firm*—J. W. Keen

[57] ABSTRACT

Two sets of hinged control doors for regulating motive steam flow from an evaporator to a condenser alternatively through a set of turbine blades in a steam bypass around the turbine blades. The evaporator has a toroidal shaped casing situated about the turbine's vertical axis of rotation and an outlet opening therein for discharging motive steam into an annular steam flow path defined between the turbine's radially inner and outer casing structures. The turbine blades extend across the steam flow path intermediate the evaporator and condenser. The first set of control doors is arranged to prevent steam access to the upstream side of the turbine blades and the second set of control doors acts as a bypass around the blades so as to maintain equilibrium between the evaporator and condenser during non-rotation of the turbine. The first set of control doors preferably extend, when closed, between the evaporator casing and the turbine's outer casing and, when open, extend away from the axis of rotation. The second set of control doors preferably constitute a portion of the turbine's outer casing downstream from the blades when closed and extend, when open, toward the axis of rotation. The first and second sets of control doors are normally held in the open and closed positions respectively by locking pins which may be retracted upon detecting an abnormal operating condition respectively to permit their closing and opening and provide steam flow from the evaporator to the condenser.

7 Claims, 10 Drawing Figures

OPEN CYCLE OCEAN THERMAL ENERGY CONVERSION STEAM CONTROL AND BYPASS SYSTEM

GOVERNMENT CONTRACT

This invention is believed to have been made or conceived in the course of, or under a contract with the United States Department of Energy identified as EG-77-03-1473.

CROSS-REFERENCE TO RELATED APPLICATIONS

This invention is related to inventions disclosed in the applications of J. M. Wittig, Ser. Nos. 934572 and 934575, whose filing dates are both Aug. 17, 1978.

BACKGROUND OF THE INVENTION

1. Field of the Invention

This invention relates to open cycle, ocean thermal energy conversion systems, and more particularly, to a steam flow control and bypass arrangement for regulating motive steam flow through a turbine component of the open cycle OTEC systems.

2. Description of the Prior Art

Ocean thermal energy conversion is a process by which the normal temperature difference existing between relatively warm surface waters and relatively cold, subsurface waters is utilized to develop a pressure difference across a turbine through which a motive fluid is expanded. The surface of large water bodies, such as oceans, acts as a large solar energy collector for heating the exposed water. The solar heated water is partially flashed into steam which acts as the cycle's motive fluid. The motive fluid's expansion through the turbine causes the turbine's rotor structure to rotate. A generator suitably coupled to the turbine's rotor rotates therewith and produces electrical energy. Due to the small temperature and pressure differences typically found in ocean thermal energy conversion cycles (30° F. and 0.3 psi by example), the cycle efficiencies are rather low. Since no fuel is consumed, the cost of operation for an ocean thermal energy conversion system is substantially reduced over conventional cycles and the primary factor limiting their use is the capital and construction costs of the equipment components. Components such as the turbine and heat exchangers must, by necessity, be very large to yield reasonable net electrical power output.

Ocean thermal energy conversion systems are typically classified to be of the open and closed cycle variety in which seawater and other volatile fluids are respectively utilized for the motive fluid. While the cycle varieties each have certain advantages over the other, a primary disadvantage of the open cycle OTEC has been the extremely large floating platform or hull structures required to support the power generation equipment and the high cost for materials and construction thereof. Reduction in the size and cost of the large platform structures required for open cycle OTEC power systems could provide a favorable advantage for such open cycles when compared with closed cycle OTEC systems. Platform elimination and/or size reduction was disclosed in J. M. Wittig's commonly assigned patent application Ser. No. 934,575. Such platform elimination utilizes optimum relative equipment disposition and integrates the equipment casings and supporting platform into one structure of complex shape. Due to the functional integration of the equipment casings and supporting platform, the resulting complexly shaped structure lent itself to fabrication from prestressed concrete. A fast responding steam flow control device for installation therein was sought to prevent turbine-generator overspeed after full load dump. It was determined that the flashed steam must be diverted around the turbine to reduce its torque and acceleration to zero as well as maintain evaporator-condenser equilibrium. An annular vane structure for bypassing steam through an annulus between rotatable turbine blades and the turbine's casing as disclosed in B. L. LaCoste's copending patent application Ser. No. 918,127 was considered. Such annular vane structure's adaptation to J. M. Wittig's functionally integrated system structure was judged economically unfeasible. System vacuum reduction, as also disclosed in patent application Ser. No. 918,127, presented a disadvantage of exerting excessive pressure loads on the complexly shaped prestressed concrete system structure. Furthermore, the large steam volumetric flow rates typically encountered in open cycle OTEC systems render the use of conventional stop valves for Wittig's functionally integrated system structure impractical due to their excessive size, pressure drop, inertia, and response time.

SUMMARY OF THE INVENTION

In accordance with the present invention, an improved open cycle ocean thermal energy conversion system is provided for generating electrical power and producing distilled water. The invention generally comprises an axial flow turbine having a vertical shaft with an annular motive fluid flow path situated thereabout and an array of blades connected to the shaft and extending across the flow path, a condenser in fluid communication with the fluid path for condensing the motive fluid expanded through the turbine blades, a flash evaporator whose toroidal casing's interior is in fluid communication with the condenser both through the turbine blades and in bypassing relationship therewith, and first and second means for regulating motive fluid flow from the evaporator to the condenser alternatively through the turbine blades and in bypassing relationship therewith.

In a preferred embodiment of the invention, the motive fluid regulating means constitute a first and a second set of control doors respectively mateable with a first and second set of control ports. The first set of control doors preferably extend, when closed, across the steam flow path upstream from the turbine blades between the evaporator casing and the turbine's outer casing structure and the second set of control doors constitute, when closed, a part of the turbine's outer casing structure downstream from the blades. The first and second sets of control doors are preferably held in their respectively normally open and closed positions by locking pins which are retractable, upon detection of an abnormal operating condition, to permit their closing and opening respectively from forces exerted thereon by the motive fluid.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

Figure 1:
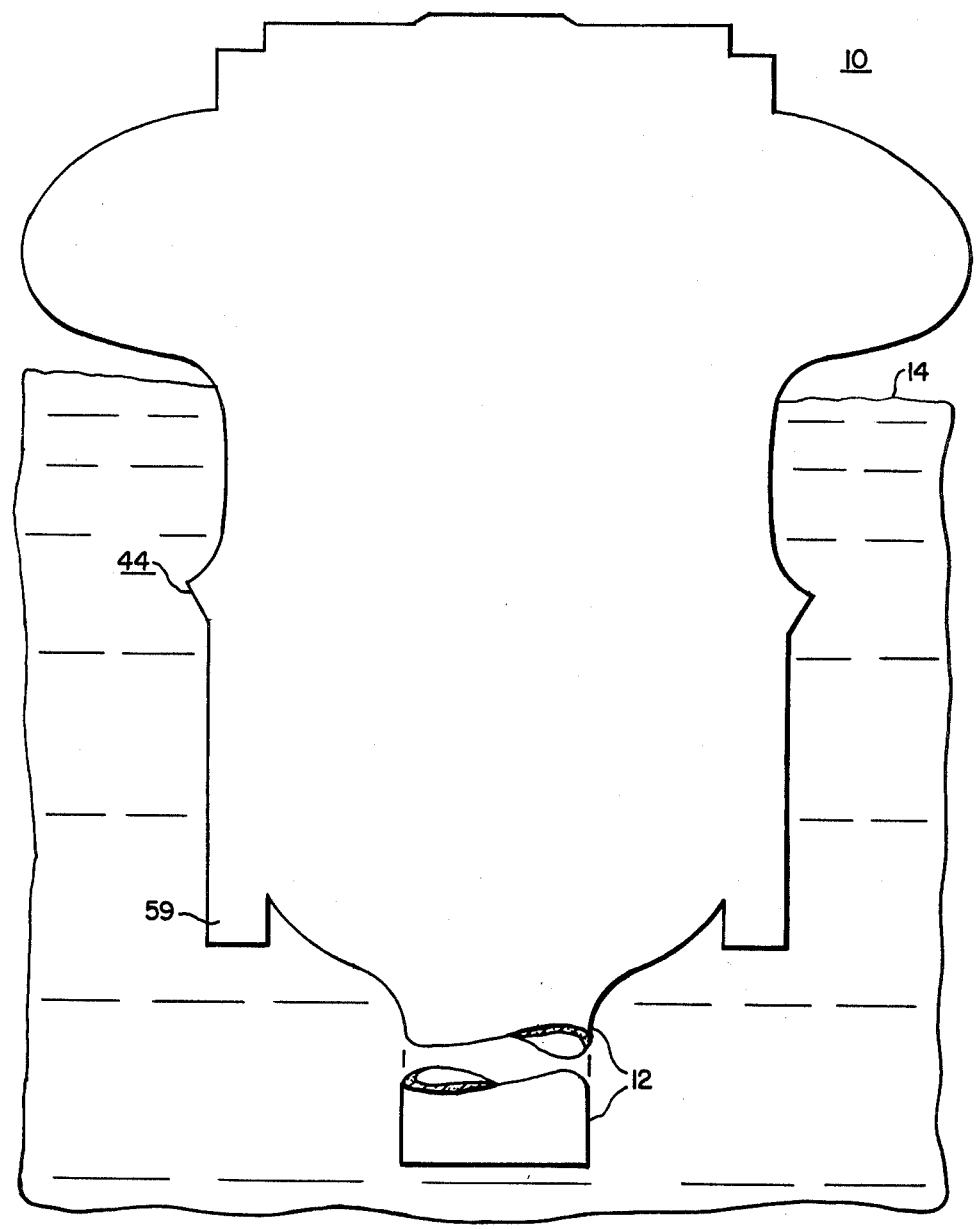
FIG. 1 is an elevation view of an open cycle OTEC system structure.

In FIG. 1 an OTEC open cycle system structure 10 is shown, disposed in operating position within a body of water such as an ocean with the illustrated representative submergence of the structure 10 within the ocean. Cold supply water conduit 12 is illustrated in a discontinuous manner since it extends approximately one thousand meters below the ocean's surface which is indicated by reference numeral 14. Cold water conduit 12 preferably constitutes prestressed concrete and rubber sections which are respectively disposed near and away from ocean surface 14. Composite conduit 12 provides a high degree of nautical stability for the generally mushroom-shaped structure 10 by penetrating to such extreme ocean depths. In the description which follows, the equipment and system structure size will pertain to an exemplary 100 megawatt net electric system. It should be understood that, however, this same system structure/packaging configuration can be utilized with different sized components or that multiple structures having the following description can, by utilizing a modular approach, be integrated into a larger overall electrical generation-water production system. Utilizing prestressed concrete for the OTEC system structure 10 enables elimination of a separate supporting platform since the prestressed concrete structure 10 simultaneously provides outer casings for the system's components and functions as a flotation device for maintaining system buoyancy within the body of water. While other materials can be utilized to form the system structure 10 and still obtain a high density power enclosure system of 3,667 cubic meters per megawatt net electric output, prestressed concrete is favored for its dual utility (containment and buoyancy) and its low material and fabrication costs.

Figure 2A:
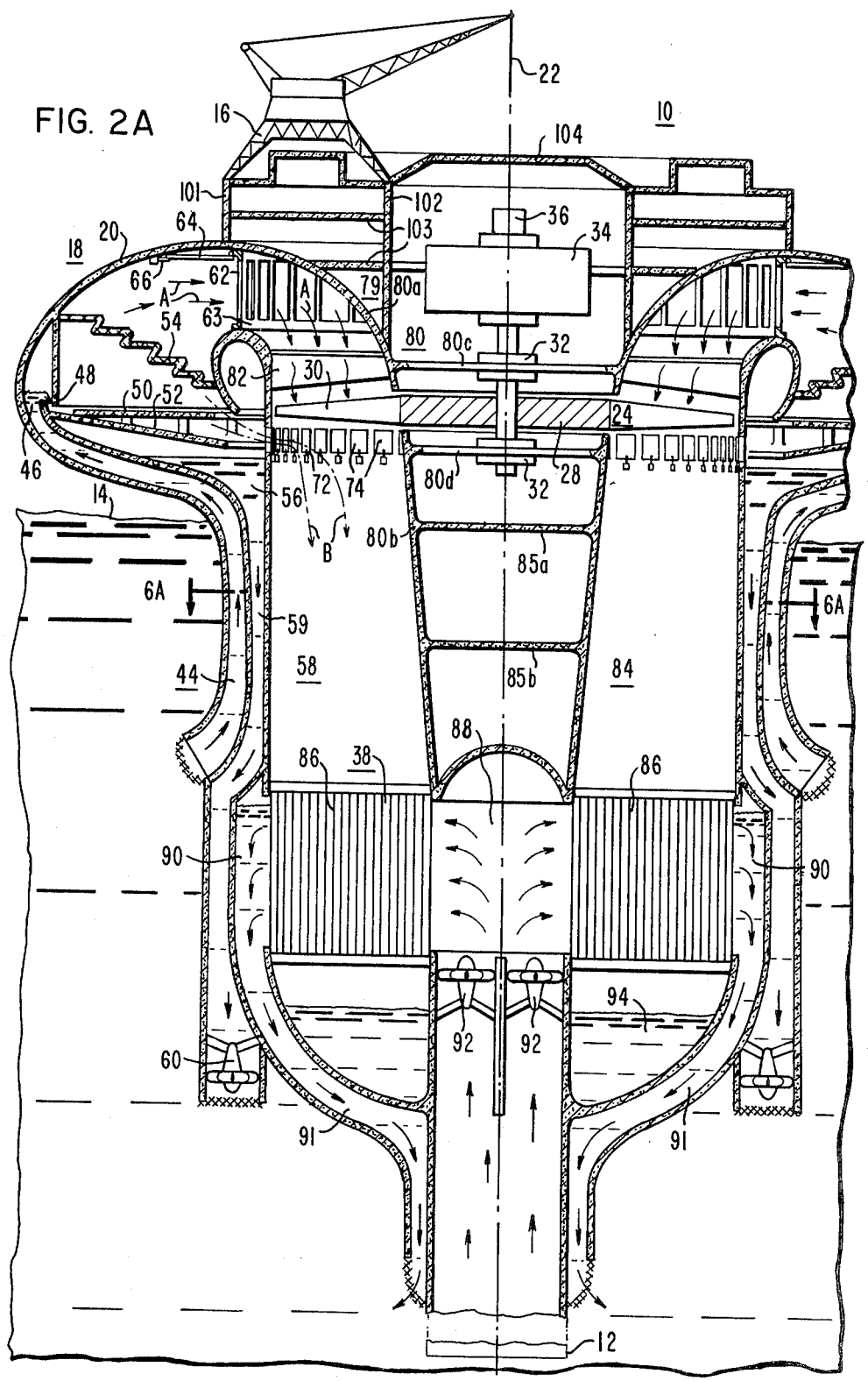
FIGS. 2A and 2B are sectional views of FIG. 1 illustrating alternate condenser tube arrangements.

FIG. 2A is a sectional view of FIG. 1. Schematic crane 16 is supported by system structure 10 and illustrates typical equipment installation and/or removal positions therefor. Flash evaporator 18 has an outer casing 20 which generally constitutes a toroidal surface. Toroidal casing 20 is radially disposed about vertical axis 22. Axial flow steam turbine 24 has a rotor structure which includes a vertical shaft 26 whose axis of rotation is substantially coincident with vertical axis 22. The rotor structure additionally includes disc portion 28 and blades 30 which preferably constitute wound fiberglass filament. Disc 28 surrounds shaft 26 and provides support for blades 30, which are attached to the radially outer periphery thereof. Disc 28 is, by example, approximately 32.7 meters in diameter and is preferably fabricated as disclosed in A. Grijalba's commonly assigned copending patent Application Ser. No. 918,125. Shaft 26 is, by example, rotatably supported by exemplary 30 inch thrust bearings 32 and is coupled to drive generator 34 and exciter 36 to produce, when rotated, electrical energy. Condenser 38 is annularly disposed about vertical axis 22 and is arranged to condense motive steam exhausting from blades 30.

Figure 4:
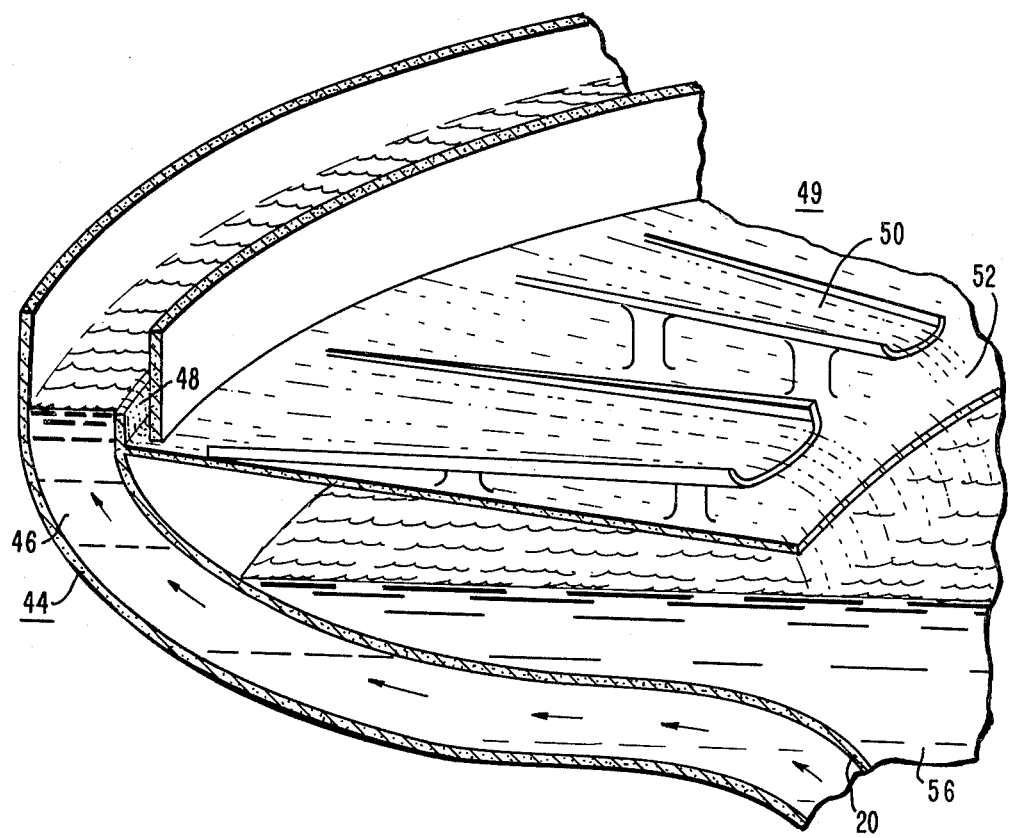
FIG. 4 is a pictorial illustration of a portion of the evaporator illustrated in FIGS. 2A and 2B.

Relatively warm ocean surface water is drawn through radially outer skirt-conduit structure 44 from a depth of approximately thirty meters through inlet opening 46 into a radially outer portion of evaporator 18's casing 20. The entering warm ocean water passes over weir 48 onto an evaporator tray structure 49 constituting two levels of evaporator trays 50 and 52, which are slightly slanted downward and radially inward. Approximately one-half to one percent of the warm ocean water passing over weir 48 flashes into steam and passes through stepped moisture separator or demister structure 54, while the remaining unflashed warm water flows radially inward and exits evaporator 18 through drain outlet 56 disposed through a radially inner portion of evaporator casing 20. Annular evaporator drain outlet 56 provides fluid access to a second skirt-conduit structure 58 which is circumferentially disposed about vertical axis 22 and includes outlet conduits 59 which transmit the warm water exiting drain outlet 56 to the ocean. FIG. 4 better illustrates outer skirt 44, weir 48, and the evaporator trays 50 and 52. Radially inward flow of the warm ocean water is imparted by weir 48 and associated evaporator tray structure 49 to minimize thermodynamic non-equilibrium and maximize steam-water separation.

At start-up time for the illustrated OTEC system, compressors evacuate evaporators 18 so as to cause relatively warm seawater to be drawn through conduits 44 and 59 into evaporator 18. Upon reaching the desired seawater level in evaporator 18 propulsion means such as pumps 60 begin to provide warm water circulation through evaporator 18. Pumps 60 are illustrated within outlet conduits 59 rather than in the inlet skirt conduits 44 to take advantage of the Barometric Level Principle in supplying minimum pumping power for the exemplary flow rate of 343 tons of water per second.

Figure 5A:
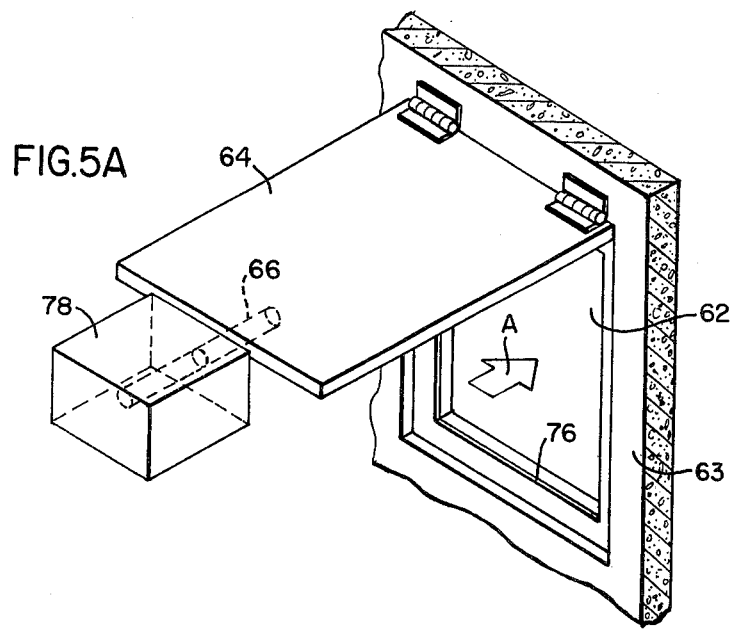
FIGS. 5A, 5B, and 5C illustrate control doors for diverting steam away to or away from the system turbine.
Figure 5B:
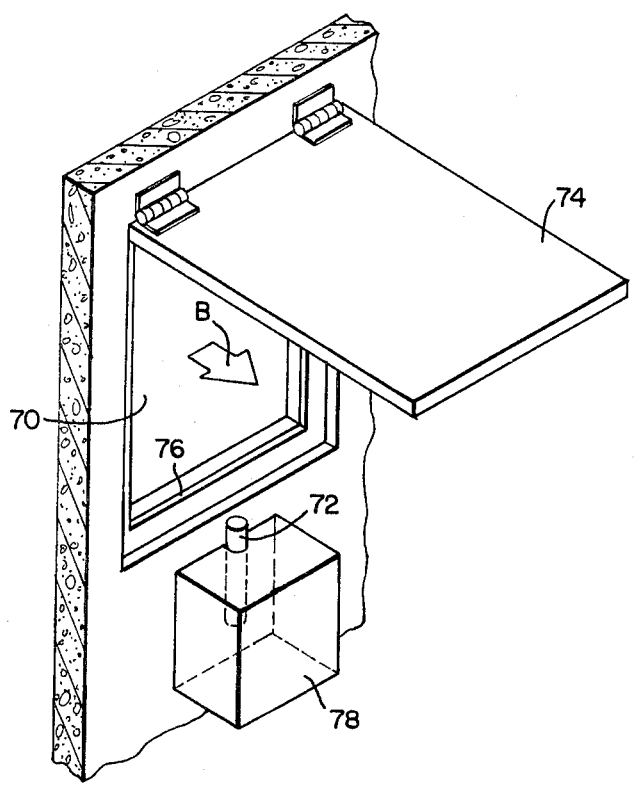
Figure 5C:
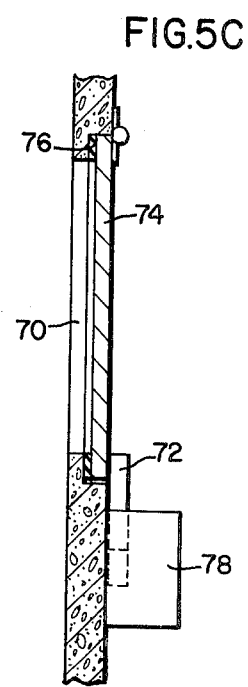

After passing through demisters 54, the steam flows in a curved path, generally radially inward, as represented by stream lines A and passes through control port's 62 in cylindrical control wall 63. Control wall 63 preferably extends between evaporator casing 20 and skirt-conduit structure 58. A plurality of such ports 62 and mateable control doors 64 are disposed circumferentially about vertical axis 22 within evaporator 18. During normal operation of the exemplary OTEC equipment, hinged control doors 64 are maintained in the illustrated, open position by extending locking pins 66 under the open doors 64 to obstruct closure thereof. When, however, a turbine overspeed or other abnormal operating condition occurs, control pins 66 are retracted, allowing control doors 64 to close and obstruct ports 62 so as to prevent motive steam from entering turbine 24. Turbine access control door 64 is better illustrated in the operating position in FIG. 5A. Control pin 66 may be actuated to the releasing position by any suitable method when one of the aforementioned abnormal conditions is detected. To avoid upsetting normal flow equilibrium between evaporator 18 and condenser 38, steam produced within evaporator 18 is bypassed to the condenser 38 around turbine 24. Bypass steam flow, under such conditions, generally follows the path indicated by stream lines B in passing through a plurality of bypass ports 70 in skirt-conduit 58. Retraction of control pins 72 allow the normal pressure differential between the evaporator and condenser to swing open hinged bypass control doors 74. Control pins 72 are preferably actuatable prior to control pins 66 to decrease the impact with which turbine access control doors 64 close. Turbine bypass control doors 74 are shown in the normal, closed operational configuration, but can be seen in the open, bypassing state in FIG. 5B. Sealing between access control doors 64 and control wall 63 and between bypass control doors 74 and the radially inner wall of skirt-conduit 58 is facilitated by interposing gaskets 76 therebetween as best illustrated in FIG. 5C. Control pins 66 and 72 are extended and retracted between obstructing and non-obstructing door positions, preferably by fast actuating means, such as electro-magnetic solenoid 78, as shown in FIGS. 5A, 5B, and 5C. During normal operation, steam following stream lines A passes into turbine inlet structure 79 through inlet ports 62 in wall 63. Skirt-conduit structure 58 provides turbine 24 with a cylindrical outer casing. A tapered inner casing structure 80 for turbine 24 includes portions 80a and 80b disposed upstream and downstream respectively of disc 28. The outer periphery of disc 28 and the base or platform of blades 30 cooperate with upstream and downstream inner casing portions 80a and 80b to provide a downwardly, radially inwardly tapered surface. The inner and outer casings therebetween define an annular motive steam flow path of increasing flow area in the downward axial direction. Turbine 24's steam inlet structure 79 receives steam from inlet ports 62 and includes radially inner wall 80a which redirects steam stream lines A from a substantially radial direction to an axial direction. Prior to entering rotatable blades 30, the motive steam passes through stationary stator vanes 82 which impart a suitable flow direction thereto compatible with entry into rotatable blades 30. After expansion through rotatable blades 30, the motive steam is exhausted through steam outlet structure 84 which includes skirt-conduit/outer casing 58 and inner casing portion 80b. Due to the diverging annular steam flow path through outlet structure 84, diffusion of the steam flow obtains resulting in a slowing of the exhausted steam and a partial conversion of its dynamic pressure into static pressure prior to its entry into condenser 38. Steam outlet structure 84 also includes inner, transverse decks, 85a and 85b which preferably house the previously mentioned evacuation compressors and other auxiliary equipment. Transverse decks 85a and 85b also provide lateral support for inner casing portion 80b since it is subjected to a vacuum on its radially outer side and substantially atmospheric pressure on its radially inner side. Inner casing portions 80a and 80b respectively include substantially circular walls 80c and 80d which are disposed on opposite axial sides of disc 28 and house bearings 32 which rotatably support shaft 26.

Figure 2B:
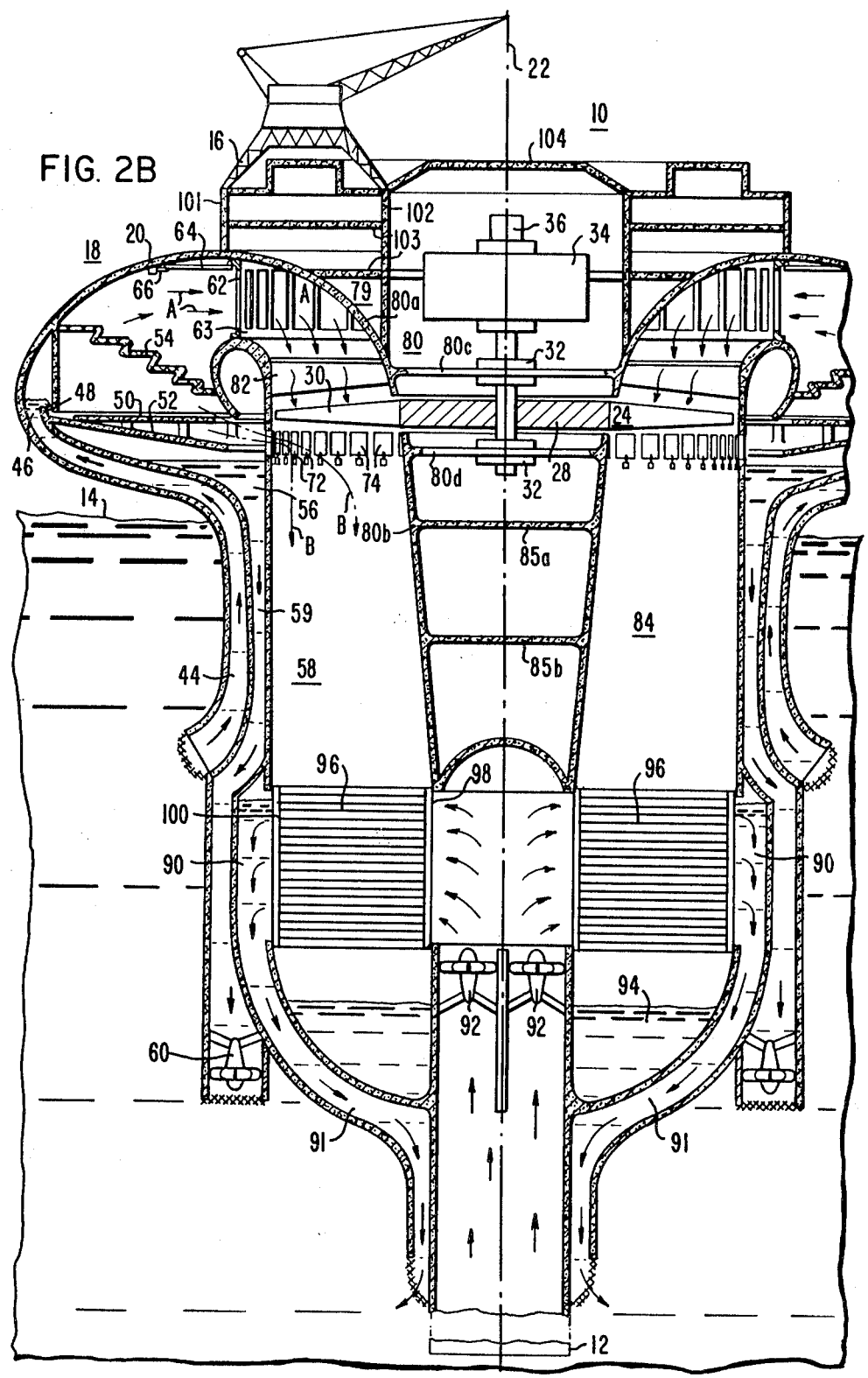

FIGS. 2A and 2B illustrate alternate embodiments for condenser 38. FIG. 2A illustrates vertical tubes 86 through which the motive steam travels and within which it is condensed by radially flowing cooling water which is segregated from the steam on the exterior of the tubes. For illustration purposes the cooling water's stream lines generally follow the paths indicated as C. The cooling water constitutes relatively cold ocean water which is drawn from depths of approximately 800 to 1,000 meters and is supplied to radially inner inlet manifold 88 through conduit 12. Cooling water flows radially outward through condenser 38 and across the exterior of tubes 86, absorbing heat and causing the motive steam to condense on the interior of tubes 86. At the radially outer edge of annular condenser 38 the heat laden cooling water passes through outlet manifold 90 into drain channel 91 both of which are included within inner skirt-conduit structure 58. The heat laden cooling water is transmitted axially downward in drain channel 91 back to the ocean by propulsion means such as pumps 92. Condensate from the motive steam drains vertically downward on the interior of tubes 86 into condensate sump 94, where it is collected for subsequent distribution.

Figure 6A:
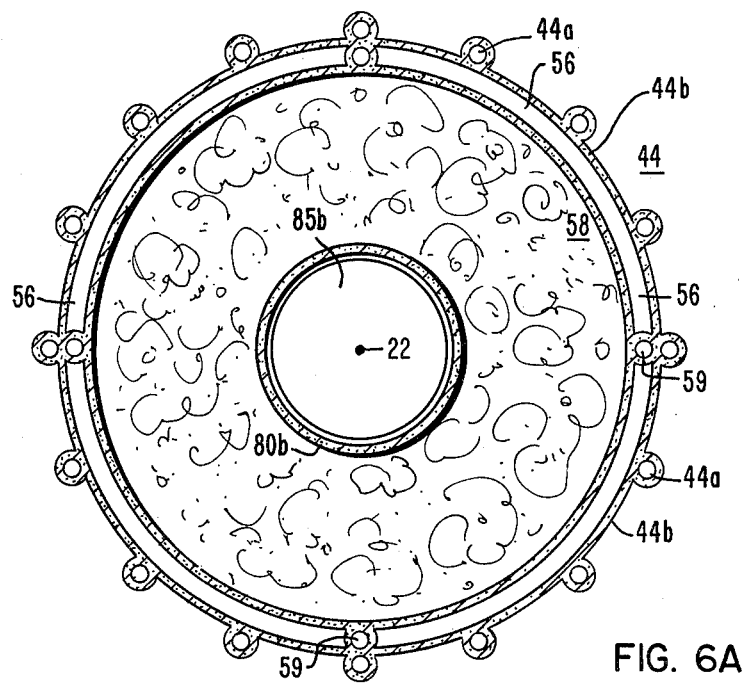
FIGS. 6A and 6B illustrate alternate plan views of an outer skirt-conduit.
Figure 6B:
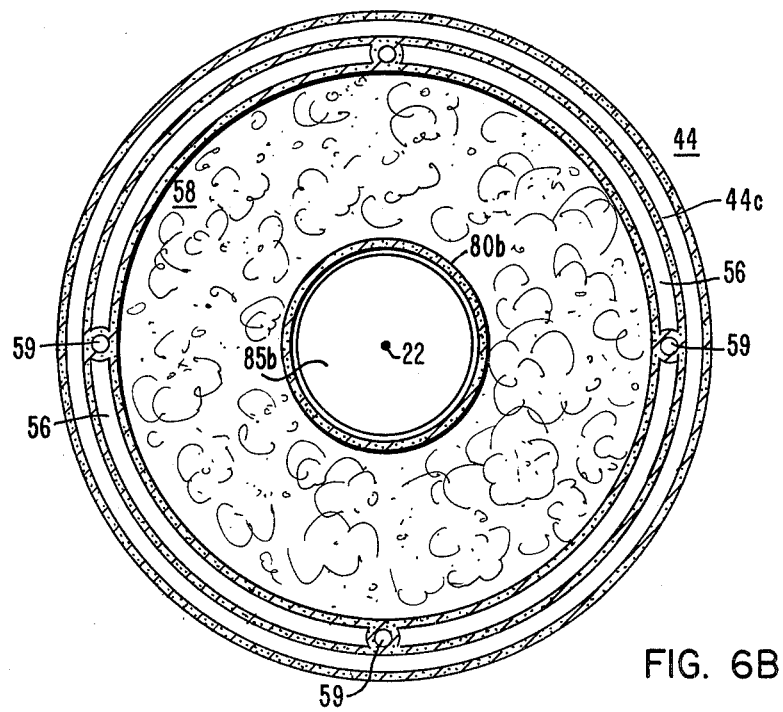

Radially outer skirt-conduit structure 44 preferably constitutes sixteen conduits 44a substantially uniformly distributed about axis 22 and a skirt member 94b which connects the included conduits. An alternate embodiment for the skirt-conduit structure includes an annular conduit 44c which also extends circumferentially about axis 22. The preferable and alternate skirt-conduit structures 44 are respectively illustrated in FIGS. 6A and 6B which are partial sectional views of FIG. 2A. Evaporator drain outlet 56 constitutes an annular channel which feeds, by example, four evaporator outlet conduits 59. Condenser drain channel 91, best shown in FIGS. 2A and 2B, preferably constitutes an annular passageway comprising part of the skirt-conduit structure 58 and is circumferentially disposed about axis 22 radially within evaporator drain outlet conduits 59. The radially inner wall of skirt-conduit 59 is seen to provide the radially outer casing of turbine 24.

FIG. 2B illustrates condenser 38 as having horizontal tubes 96, which extend through radially inner tube sheets 98 and radially outer tube sheets 100. In such configuration cooling water retains the flow pattern indicated in FIG. 2A by stream lines C, but now passes through the interior of tubes 96, causing motive steam exhausted into condenser 38 to be condensed on the exterior of tubes 96. The resulting condensate drains into annular sump 94 in a similar manner to the embodiment of FIG. 2A.

Figure 3:
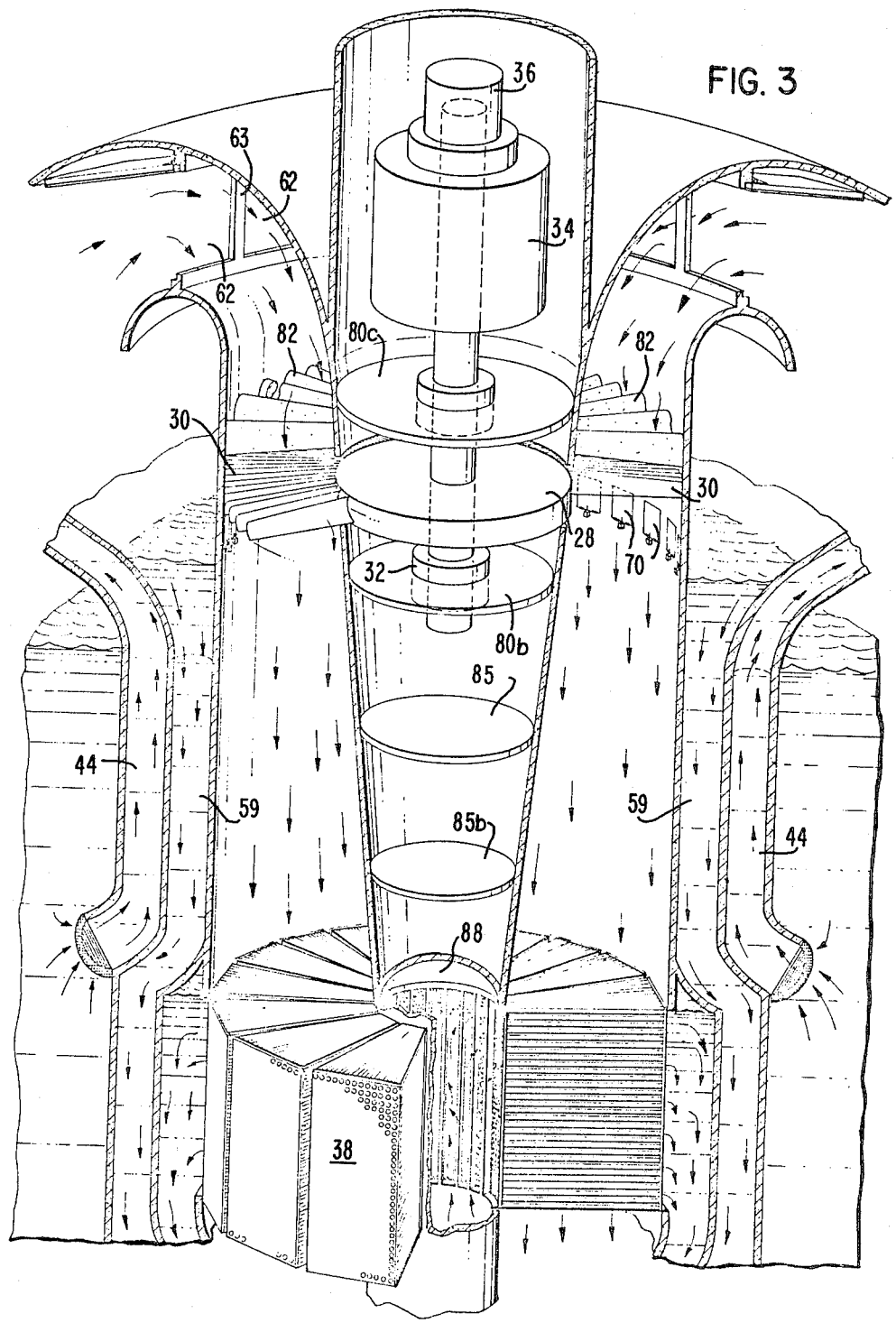
FIG. 3 is a cutaway pictorial illustration of the system shown sectioned in FIG. 2B.

FIG. 3 is a pictorial cutaway illustration of an inner portion of the system structure shown in FIG. 2B. The bypass control doors 74 illustrated in FIG. 3 are hinged along their bottom rather than their top as shown in FIG. 5B. Both bypass control door embodiments are functionally acceptable to accomplish proper transmission of bypass steam flow.

System structure 10 generally has a toroidal portion near its top and a cylindrical portion extending down therefrom so as to compositely resemble a mushroom. The toroidal evaporator casing 20 and generally cylindrical skirt-conduit/turbine casing 58 were chosen and assembled to provide a composite structural shape which is a compromise between conventionally constructed equipment casings and the vessel of minimum wall thickness—a sphere. Vertical, cylindrical bulkheads 101 and 102 are radially separated and circumferentially disposed about axis 22 above toroidal casing 20 and turbine inlet structure 79. Annular decks 103 are horizontally disposed between the bulkheads to provide rooms for housing the OTEC structure's crew and equipment control facilities. Access cover 104 disposed across the circular space bounded by bulkhead 102 can be removed by crane 16 to facilitate repair and/or maintenance of equipment components such as turbine 24, generator 34, and exciter 36. A judicious material choice for the complexly shaped system structure 10 such as prestressed concrete permits elimination of the conventional ship, hull or platform which was heretofore considered an expensive component of the open cycle OTEC system.

It will now be apparent that an improved OTEC open cycle power system has been provided in which the power cycle's component equipment casings structurally cooperate to simultaneously function as a hull structure. The equipment casing's structural and functional cooperation has reduced total plant capital cost for the exemplary 100 MWE system to $1500 per net KW electrical output. While the illustrated system is described as producing net electrical output and distilled water as a valuable byproduct, it is to be understood that component equipment size can be reduced to provide zero net electrical output if water production alone is to be economically maximized for a given system structure.

What we claim is:

1. An open cycle ocean thermal energy conversion system comprising:
   an axial flow turbine having a rotor whose axis of rotation is vertical and radially inner and outer casing structures which therebetween define an annular motive fluid path, said rotor including an annular array of radial blades extending across said fluid path;
   a condenser in fluid communication with said annular motive fluid flow path for condensing the motive fluid expanded through the turbine blades;
   a flash evaporator disposed about the turbine's axis of rotation, said evaporator having a generally toroidal-shaped casing, the interior of said casing being in fluid communication with said condenser both through and in bypassing relationship with said turbine blades;
   first means for regulating motive fluid flow from said evaporator to said condenser through said turbine blades; and
   second means for regulating bypass motive fluid flow from said evaporator to said condenser.

2. The system of claim 1, said first regulating means comprising:
   a control wall disposed between said evaporator casing and said turbine's outer casing structure, said wall having ports therein for transmitting motive fluid therethrough;
   a plurality of hinged access control doors for selectively obstructing said ports against motive fluid flow therethrough;
   locking means for releasably retaining said control doors in an open position; and
   means for selectively actuating said locking means.

3. The system of claim 2, wherein said control doors, when open, extend away from said axis of rotation.

4. The system of claim 2, said locking means comprising a plurality of pins displaceable between positions which obstruct and permit door closure.

5. The system of claim 1, said second regulating means comprising:
   a plurality of ports in said turbine's outer casing structure downstream from said blades permitting fluid communication between said evaporator and said turbine's annular fluid path;
   a plurality of hinged bypass control doors for selectively obstructing said ports against motive fluid flow therethrough;
   locking means for releasably retaining said bypass control doors in a closed position; and
   means for selectively actuating said locking means.

6. The system of claim 5, wherein said bypass control doors, when open, extend toward the axis of rotation.

7. The system of claim 5, said locking means comprising a plurality of pins displaceable between positions which obstruct and permit bypass door opening.

* * * * *